United States Patent [19]

Sacripante et al.

[11] Patent Number: 5,693,128
[45] Date of Patent: Dec. 2, 1997

[54] PHASE CHANGE HOT MELT INK COMPOSITIONS

[75] Inventors: Guerino G. Sacripante, Oakville; Fatima M. Mayer, Mississauga; Stephan V. Drappel, Toronto; Anthony J. Paine; Gregory J. Kovacs, both of Mississauga, all of Canada

[73] Assignee: Xerox Corporation, Stamford, Conn.

[21] Appl. No.: 786,394

[22] Filed: Jan. 21, 1997

[51] Int. Cl.⁶ ............................................. C09D 11/10
[52] U.S. Cl. ........................................ 106/31.27; 106/31.6
[58] Field of Search .............................. 106/20 R, 20 D, 106/22 A, 22 M, 31.27, 31.6

[56] References Cited

U.S. PATENT DOCUMENTS

| | | | |
|---|---|---|---|
| 4,490,731 | 12/1984 | Vaught | 346/140 R |
| 4,751,528 | 6/1988 | Spehrley, Jr. et al. | 346/140 R |
| 5,006,170 | 4/1991 | Schwarz et al. | 106/20 |
| 5,041,161 | 8/1991 | Cooke et al. | 106/22 |
| 5,121,141 | 6/1992 | Hadimoglu et al. | 346/140 R |

*Primary Examiner*—Peter A. Szekely
*Attorney, Agent, or Firm*—E. O. Palazzo

[57] ABSTRACT

An ink composition comprised of a colorant and a reversible crosslinked component vehicle obtained from the reaction product of an anhydride and an organoamine, and which ink possesses a viscosity of from about 1 centipoise to about 25 centipoise at a temperature of from about 125° C. to about 185° C.

23 Claims, No Drawings

PHASE CHANGE HOT MELT INK COMPOSITIONS

REFERENCE TO COPENDING PATENT APPLICATIONS

Hot melt inks are illustrated in copending patent applications U.S. Ser. No. 624,154, U.S. Ser. No. 624,157, U.S. Ser. No. 624,156, U.S. Ser. No. 624,273, and U.S. Ser. No. 641,866, the disclosures of each being totally incorporated herein by reference.

BACKGROUND OF THE INVENTION

The present invention is directed to ink compositions and, more specifically, the present invention relates to hot melt inks especially useful for acoustic ink printing, processes and apparatuses, reference for example U.S. Pat. No. 5,121,141, U.S. Pat. No. 5,111,220, U.S. Pat. No. 5,128,726, U.S. Pat. No. 5,371,531, the disclosures of which are totally incorporated herein by reference, including especially acoustic ink processes as illustrated in some of the aforementioned copending applications and patents, such as an acoustic ink printer for printing images on a record medium.

More specifically, the present invention is directed to hot melt acoustic ink compositions wherein there can be generated with such inks excellent developed images with acceptable image permanence, excellent projection efficiency on transparencies without a post fusing step, and excellent crease resistance, and wherein the inks possess acceptable, and in embodiments superior lightfastness and superior waterfastness. Moreover, in embodiments of the present invention there is enabled the elimination, or minimization of undesirable paper curl since water is not present, or very small amounts thereof are selected, in the invention inks, and it is preferred that there be an absence of water, and since water is not present in the inks a dryer can be avoided thereby minimizing the cost of the acoustic ink jet apparatus and process. The inks of the present invention in embodiments thereof are comprised of a colorant and a vehicle, and more specifically, wherein the vehicle is a reversible crosslinked component, that is for example a resin that possesses a low viscosity at high temperatures and excellent mechanical characteristics after being selected for printing, or wherein the ink vehicle is a liquid at high temperatures to enable, for example, a low ink viscosity for jetting, and be resin like in its characteristics after jetting to enable excellent fixing properties, and which vehicle is obtained from the reaction of an anhydride and a diamine or a triamine. The reversible crosslinked vehicle can exist as a mixture of an imido amine and a polyamide resin, and wherein the equilibria favors a mixture of predominately the imido amine at low temperatures such as from about 20° C. to about 120° C., and predominately a polyamide at higher temperatures such as from about 125° C. to about 180° C.

PRIOR ART

In acoustic ink printing, the printhead produces approximately 2.2 picoliter droplets by an acoustic energy process. The ink under these conditions should display a melt viscosity of about 5 centipoise or less at the jetting temperature. Furthermore, once the ink is jetted onto the paper, the ink image should be of excellent crease property, and should be nonsmearing waterfast, of excellent transparency and excellent fix qualities. In selecting an ink for such applications, it is desirable that the vehicle display a low melt viscosity, such as from about 1 centipoise to about 25 centipoise in the acoustic head, while also displaying solid like properties after being jetted onto paper. Since the acoustic head can tolerate a temperature up to about 180° C., and preferably up to a temperature of from about 140° C. to about 160° C., the vehicle for the ink should preferably display liquid like properties, such as a viscosity of 1 to about 10 centipoise, at a temperature of from about 125° C. to about 165° C., and solidify or harden after jetting onto paper such that the ink displays a hardness value of from about 0.1 to about 0.5 millimeter utilizing a penetrometer according to the ASTM penetration method D1321.

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle is chosen to have a melting point above room temperature so that the ink, which is melted in the apparatus, will not be subject to evaporation or spillage during periods of nonprinting. The vehicle selected possesses a low critical temperature to permit the use of the solid ink in a thermal ink jet printer. In thermal ink jet printing processes employing hot melt inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby attempting to enable higher print density than is generally obtained with liquid inks. Hot melt ink jets are somewhat similar to thermal ink jets, however, a hot melt ink contains no solvent. Thus, rather than being liquid at room temperature, a hot melt ink is typically a solid or semi-solid having a wax-like consistency. These inks usually need to be heated, for example, to approximately 100° C. before the ink melts and turns into a liquid. With hot melt inks, a plurality of ink jet nozzles are provided in a printhead. A piezoelectric vibrating element is located in each ink channel upstream from a nozzle so that the piezoelectric oscillations propel ink through the nozzle. After the hot melt ink is applied to the substrate, the ink is resolidified by freezing on the substrate.

Each of these types of known ink jets, however, has a number of advantages and disadvantages. One advantage of thermal ink jets is their compact design for the integrated electronics section of the printhead. Thermal ink jets are disadvantageous in that the thermal ink has a tendency to soak into a plain paper medium. This blurs the print or thins out the print locally thereby adversely affecting print quality. Problems have been encountered with thermal ink jets in attempting to rid the ink of moisture fast enough so that the ink does not soak into a plain paper medium. This is particularly true when printing with color. Therefore, usually when printing with thermal ink, one needed to use coated papers, which are more expensive than plain paper.

One advantage of a hot melt ink jet is its ability to print on plain paper since the hot melt ink quickly solidifies as it cools and, since it is waxy in nature, does not normally soak into a paper medium. However, hot melt ink jets can be cumbersome in structure and in design, that is, the associated integrated electronics of a thermal ink jet head are considerably more compact than those of a hot melt ink jet head.

In addition, U.S. Pat. No. 4,751,528, the disclosure of which is totally incorporated herein by reference, discloses a hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with hot melt inks having an integrally connected ink jet head and reservoir system, the reservoir system including a highly efficient heat conducting plate inserted within an essentially nonheat conducting reservoir housing. The reservoir system has a sloping flow path between an inlet position and a sump from which ink is drawn to the head, and includes a plurality of vanes situated upon the plate for rapid heat transfer.

Ink compositions for ink jet printing are known. For example, U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 and U.S. Pat. No. 5,122,187, the disclosures of each of which are totally incorporated herein by reference, disclose hot melt ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, amides, imides, halocarbons, and the like. The inks of the present invention are dissimilar than the aforementioned '170 and '187, in that, for example, the invention vehicle selected displays a viscosity of from about 1 to about 20, and preferably 10 centipoise when heated to a temperature of from about 125° C. to about 165° C., such that acoustic energy in the printhead can eject an ink droplet onto paper. Additionally, the vehicles of the present invention display softening points of from about 50° C. to about 100° C.

U.S. Pat. No. 5,041,161, the disclosure of which is totally incorporated herein by reference, discloses an ink jet ink which is semi-solid at room temperature. The ink combines the advantageous properties of thermal phase inks and liquid inks. The inks comprise vehicles, such as glyceryl esters, polyoxyethylene esters, waxes, fatty acids, and mixtures thereof, which are semi-solid at temperatures between 20° C. and 45° C. The ink is impulse jetted at an elevated temperature in the range of about 45° C. to about 110° C., at which temperature the ink has a viscosity of about 10 to 15 centipoise. The inks also contain 0.1 to 30 weight percent of a colorant system.

U.S. Pat. No. 4,853,036 and U.S. Pat. No. 5,124,718 disclose an ink for ink jet recording which comprises a liquid composition essentially comprising a coloring matter, a volatile solvent having a vapor pressure of 1 millimeter Hg or more at 25° C., and a material being solid at room temperature and having a molecular weight of 300 or more, and prepared so as to satisfy the formula $B1/A1\overset{.}{o}3$, assuming viscosity as A1 cP at 25° C., measured when the content of the solid material in the composition is 10 percent by weight, and assuming viscosity as B1 cP at 25° C., measured when the content of the solid material in the composition is 30 percent by weight. An ink jet recording process using the ink is also disclosed.

SUMMARY OF THE INVENTION

While the known ink compositions and processes may be suitable for their intended purposes, a need remains for acoustic hot melt ink compositions suitable for thermal ink jet printing. In addition, there is a need for hot melt ink compositions which are compatible with a wide variety of plain papers. Further, there is a need for hot melt ink compositions which generate high quality, waterfast images on plain papers. There is also a need for hot melt ink jet ink compositions which generate high quality, fast-drying images on a wide variety of plain papers at low cost with high quality text and high quality graphics. Further, there is a need for hot melt ink jet ink compositions which exhibit minimal feathering. Additionally, there is a need for hot melt ink jet ink compositions which exhibit minimal intercolor bleed. There is also a need for hot melt ink jet ink compositions which exhibit excellent image permanence. Further, there is a need for hot melt ink jet ink compositions which are suitable for use in acoustic ink jet printing processes. Additionally, there is a need for hot ink compositions suitable for ink jet printing processes wherein the substrate is heated prior to printing and is cooled to ambient temperature subsequent to printing (also known as heat and delay printing processes). There is also a need for ink compositions suitable for ink jet printing wherein high optical densities can be achieved with relatively low dye concentrations. A need also remains for ink compositions suitable for ink jet printing wherein curling of the substrate, such as paper, subsequent to printing is minimized, or avoided. These and other needs can be achievable with the inks of the present invention in embodiments thereof.

Examples of objects of the present invention include, for example:

It is an object of the present invention to provide hot melt ink compositions with many of the advantages illustrated herein.

It is another object of the present invention to provide hot melt ink compositions suitable for acoustic ink jet printing.

It is yet another object of the present invention to provide hot melt ink compositions which are compatible with a wide variety of plain papers.

It is still another object of the present invention to provide hot melt ink compositions which generate high quality images on plain papers.

Another object of the present invention is to provide hot melt ink jet ink compositions which are comprised of a colorant, preferably a dye, and vehicle comprised of a reversible crosslink material such as an organo amino-imide/polyamide equilibria mixture, and wherein in embodiments the inks possess a low viscosity of, for example, 5 to 20 at 160° C.

Yet another object of the present invention is to provide hot ink jet ink compositions which exhibit low viscosity of from about 1 to about 10 centipoise at a temperature of from about 125° C. to about 160° C.

Still another object of the present invention is to provide hot melt ink jet ink compositions which exhibit minimal intercolor bleed.

It is another object of the present invention to provide hot melt ink jet ink compositions which exhibit excellent image permanence.

It is yet another object of the present invention to provide hot ink jet ink compositions that contain no water and which are suitable for use in acoustic ink jet printing processes.

It is still another object of the present invention to provide hot ink compositions that contain no water and that are suitable for ink jet printing processes wherein the substrate is heated prior to printing and is cooled to ambient temperature subsequent to printing (also known as heat and delay printing processes).

Another object of the present invention is to provide ink compositions suitable for ink jet printing wherein high optical densities can be achieved with relatively low dye concentrations.

Yet another object of the present invention is to provide solvent free hot melt ink compositions suitable for ink jet printing wherein curling of the substrate subsequent to printing is minimized.

Another object of the present invention resides in the provision of hot melt inks wherein the viscosity of the ink is from about 1 centipoise to about 10 centipoise at, for example, the jetting temperature which can be from about 125° C. to about 180° C., and preferably from about 160° C. thereby enabling excellent jetting at reasonable power levels.

Further, in another object of the present invention there are provided hot melt inks with no water and vehicles such as a reversible crosslinked vehicle, and a colorant such as a dye, or a pigment.

Additionally, in another object of the present invention there are provided hot melt inks with no water or solvent for ink printing methods and apparatuses, and wherein a number of the advantages as illustrated herein are achievable.

The present invention relates to an ink composition comprised of a colorant and a reversible crosslinked vehicle obtained from the reaction product of an anhydride and an organic amine, including diamines, triamines, tetraamines, or mixtures thereof, and which ink preferably possesses a viscosity of from about 1 centipoise to about 25 centipoise at a temperature of from about 125° C. to about 185° C.; and an ink composition wherein the crosslinked component is obtained from the reaction product of an anhydride and a diamine, resulting in an imido amine wherein the amino group undergoes a ring opening reaction with the imide to form a crosslinked amide, and optional known ink additives.

DETAILED DESCRIPTION OF THE INVENTION

In embodiments the ink compositions of the present invention comprise a dye or pigment, and a reversible crosslinked vehicle, and wherein the colorant is present in various effective amounts, such as from about 2 to about 10 weight percent, and the vehicle is present in an amount of from about 60 to about 90 weight percent.

Embodiments of the present invention include an ink composition comprised of a dye, a reversible crosslinked vehicle obtained from the reaction of an anhydride and diamine or triamine, and resulting in the equilibria reaction mixture of an organoimide-amine and polyamide.

Embodiments of the present invention include an ink composition comprised of a colorant and a reversible crosslinked component vehicle obtained from the reaction product of an anhydride and an organoamine, and which ink possesses a viscosity of from about 1 centipoise to about 25 centipoise at a temperature of from about 125° C. to about 185° C.; an ink composition wherein said reversible crosslinked vehicle is obtained from the reaction product of an anhydride like phthalic anhydride and an organoamine, such as a diamine or a triamine, and which reaction product results in a temperature dependent equilibria reaction mixture of an imido amine and polyamide of the structure

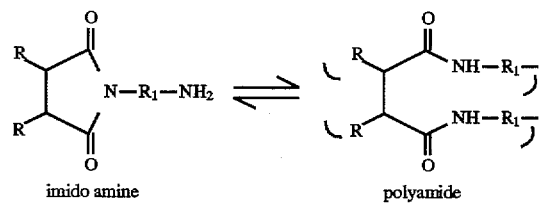

imido amine        polyamide        I.

or

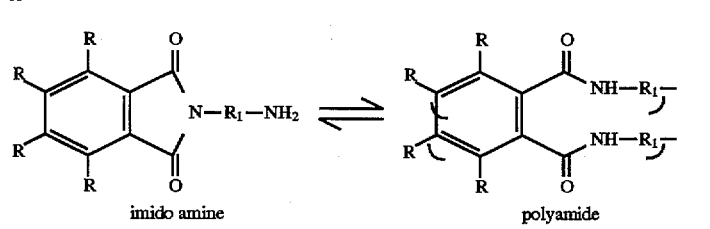

imido amine        polyamide        II.

wherein R is hydrogen, alkyl, or alkenyl, each with from about 1 to about 36 carbon atoms, and $R_1$ is an alkylene or polyoxyalkylene, each with from about 2 to about 36 carbon atoms; an ink composition wherein the vehicle I or II is comprised of from about 75 to about 95 percent by weight of polyamide and from about 5 to about 25 percent by weight of imido amine at a temperature of from about 20° C. to about 100° C., and the vehicle I or II is comprised of from about 75 to about 95 percent by weight of imido amine and from about 5 to about 25 percent by weight of polyamide at a temperature of from about 120° C. to about 160° C.; an ink composition wherein the anhydride is selected from the group consisting of phthalic anhydride, 3-methylphthalic anhydride, succinic anhydride, 2-alkylsuccinic anhydride such as 2-methylsuccinic anhydride, 2-ethylsuccinic anhydride, 2-propylsuccinic anhydride, 2-butylsuccinic anhydride, 2-octylsuccinic anhydride, 2-stearylsuccinic anhydride, 2-octadecen-2yl-succinic anhydride, 2-decen-2yl-succinic anhydride, and 2-dodecen-2yl-succinic anhydride; an ink composition wherein the polyamide possesses a molecular weight of from about 1,500 to about 15,000 grams per mole; an ink composition wherein the ink is a solid at room temperature, about 20° C. to about 40° C.; an ink composition wherein said polyamide of I or II is present in an amount of from about 60 to about 99 weight percent at a temperature of from about 20° C. to about 120° C.; an ink composition wherein said polyamide of I or II is present in an amount of from about 85 to about 97 weight percent at a temperature of from about 20° C. to about 120° C.; an ink composition wherein said imido amine of I or II is present in an amount of from about 60 to about 99 weight percent at a temperature of from about 120° C. to about 165° C.; an ink composition wherein said imido amine of I or II is present in an amount of from about 85 to about 97 weight percent at a temperature of from about 120° C. to about 165° C.; a printing process which comprises incorporating into an acoustic ink jet printer an ink comprised of a colorant and a crosslinked reversible vehicle obtained from the reaction product of an anhydride and an organic amine, and which ink possesses a viscosity of from about 1 centipoise to about 25 centipoise at a temperature of from about 125° C. to about 185° C., a viscosity of from about 5 centipoise to about 20 centipoise at a temperature of from about 125° C. to about 185° C., and causing droplets of the ink to be ejected in imagewise pattern onto a substrate; a process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, said ink comprising a colorant and a reversible crosslinked resin obtained from the reaction product of an anhydride and an organic amine, and which ink possesses a viscosity of from about 1 centipoise to about 25 centipoise at a temperature of from about 125° C. to about 185° C., viscosity of from about 5 centipoise to about 20 centipoise at a temperature of from about 125° C. to about 185° C., and (b) causing droplets of said ink to be ejected onto a recording sheet in an imagewise pattern at a temperature of from about 120° C. to about 185° C.; an ink composition wherein alkyl contains from 1 to 6 carbon atoms; an ink composition wherein alkenyl contains from 1 to about 10 carbon atoms; an ink composition wherein $R_1$ is alkenyl with from 2 to about 8 carbon atoms; an ink composition wherein the colorant is a pigment; and an ink composition wherein said organic amine is a tetraamine, a diamine, a triamine or mixtures thereof.

The organic amine, preferably an organic diamine, can be selected from the group consisting of 1,2-diaminoethane, 1,2 Ä diaminopropane, 1,4-diaminobutane, 1,5-diaminopentane, 2Ämethylpentylene diamine, 1,6-diaminohexane, 1,8-diaminooctane, 1,10Ädiaminodecane, 1,12-diaminododecane, poly(oxyalkyleneoxy)-diamine available from Huntsman Corporation as JEFFAMINE™ 148, 230, 400, 192, 700 and 403, illustrated by the formula

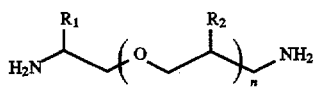

wherein R is hydrogen or alkyl like $CH_3$; and n is 2 to 21; and which diamine is utilized in an amount of, for example, from about 0.35 mole equivalent to about 0.65 mole equivalent of the vehicle.

The anhydride utilized in the preparation of the reversible crosslink vehicle can be selected from the group consisting of phthalic anhydride, 3-methylphthalic anhydride, succinic anhydride, 2-alkylsuccinic anhydride such as 2-methylsuccinic anhydride, 2-ethylsuccinic anhydride, 2-propylsuccinic anhydride, 2-butylsuccinic anhydride, 2-octylsuccinic anhydride, 2-stearylsuccinic anhydride, 2-octadecen-2yl-succinic anhydride, 2-decen-2yl-succinic anhydride, 2-dodecen-2yl-succinic anhydride, mixtures thereof, and the like, including other known anhydrides, and which anhydride is utilized in an amount of, for example, about 0.35 mole equivalent to about 0.65 mole equivalent of the vehicle.

Examples of the imido amines include N-aminododecyl phthalimide, N'-10-amino-decyl phthalimide, N'-8-aminooctyl phthalimide, N'-6-amino-hexyl phthalimide, N'-5-amino-pentyl phthalimide, N'-4-amino-butyl phthalimide, N'-3-amino-propyl phthalimide, N'-2-amino-ethyl phthalimide, N'-ethyloxyethylamine phthalimide, N'-ethyloxyethyloxyethylamine phthalimide, N'-ethyloxyethyloxyethyloxyethylamine phthalimide, N'-ethyloxyethyloxyethyloxyethyloxyethylamine phthalimide, N'-(polyethyloxy)ethylamine phthalimide, N'-(polypropyloxy)propylamine phthalimide, N'-12-aminododecyl 3-methylphthalimide, N'-(polyethyloxy) ethylamine 3-methylphthalimide, N'-(polypropyloxy) propylamine 3-methylphthalimide, N'-12-aminododecyl succinimide, N'-(polyethyloxy)ethylamine succinimide, N'-(polypropyloxy)propylamine succinimide, N'-12-aminododecyl 2-octylsuccinimide, N'-(polyethyloxy) ethylamine 2-octylsuccinimide, N'-(polypropyloxy) propylamine 2-octylsuccinimide, N'-12-aminododecyl 2-stearylsuccinimide, N'-(polyethyloxy)ethylamine 2-stearylsuccinimide, N'-(polypropyloxy)propylamine 2-stearylsuccinimide, N'-(polyethyloxy)ethylamine 2-octadecen-2yl-succinimide, N'-12-aminododecyl 2-octadecen-2yl-succinimide, N'-12-aminododecyl 2-decen-2yl-succinimide, and N'-12-aminododecyl 2-dodecen-2yl-succinmide, and which amine is present in an effective amount of from about 60 to about 97 percent by weight of the ink at a temperature of from about 120° C. to about 165° C. during jetting from the acoustic printing device onto paper, and present in an amount of from about 5 to about 35 percent by weight of the ink when the ink is on the paper or substrate, and cooled to a temperature of from about 20° C. to about 45° C.

Examples of the polyamide include a crosslinked poly (N'-12-aminododecyl) phthalamide, crosslinked poly(N'-10-aminodecyl) phthalamide, crosslinked poly(N'-8-aminooctyl) phthalamide, crosslinked poly(N'-6-amino-hexyl) phthalamide, crosslinked poly(N'-5-amino-pentyl) phthalimade, crosslinked poly(N'-4-amino-butyl) phthalamide, crosslinked poly(N'-3-amino-propyl) phthalimide, crosslinked poly(N'-2-amino-ethyl) phthalamide, crosslinked poly(N'-ethyloxyethylamine) phthalamide, crosslinked poly(N'-ethyloxyethyloxyethylamine) phthalamide, crosslinked poly (N'-ethyloxyethyloxyethyloxyethylamine) phthalamide, crosslinked poly(N'-ethyloxyethyloxyethyloxyethyloxyethylamine) phthalamide, crosslinked poly(N'-(polyethyloxy) ethylamine) phthalamide, crosslinked poly(N'-(polypropyloxy)propylamine) phthalamide, crosslinked poly(N'-12-aminododecyl) 3-methylphthalamide, crosslinked poly(N'-(polyethyloxy)ethylamine) 3-methylphthalamide, crosslinked poly(N'-(polypropyloxy) propylamine) 3-methylphthalamide, crosslinked poly(N'-12-aminododecyl) succinamide, crosslinked poly(N'-(polyethyloxy)ethylamine) succinamide, crosslinked poly (N'-(polypropyloxy)propylamine) succinamide, crosslinked poly(N'-12-aminododecyl) 2-octylsuccinamide, crosslinked poly(N'-(polyethyloxy)ethylamine) 2-octylsuccinamide, crosslinked poly(N'-(polypropyloxy)propylamine) 2-octylsuccinamide, crosslinked poly(N'-12-aminododecyl) 2-stearylsuccinamide, crosslinked poly(N'-(polyethyloxy) ethylamine) 2-stearylsuccinamide, crosslinked poly(N'-(polypropyloxy)propylamine) 2-stearylsuccinamide, crosslinked poly(N'-(polyethyloxy)ethylamine) 2-octadecen-2yl-succinamide, crosslinked poly(N'-12-aminododecyl) 2-octadecen-2yl-succinamide, crosslinked poly(N'-12-aminododecyl) 2-decen-2yl-succinamide, and crosslinked poly(N'-12-aminododecyl) 2-dodecen-2yl-succinamide, and which polyamide is present in an effective amount of, for example, from about 5 to about 65 percent by weight of the ink at a temperature of from about 120° C. to about 165° C. during jetting from the acoustic printing device onto paper, and which polyamide is, for example, present in an amount of from about 65 to about 97 percent by weight of the ink when the ink is on the paper or substrate and cooled to a temperature of from about 20° C. to about 45° C.

Examples of colorants, preferably dyes selected for the inks of the present invention, are known, reference the Color Index, and include those as illustrated in U.S. Pat. No. 5,310,887, the disclosure of which is totally incorporated herein by reference, and, for example, Resorcin Crystal Violet, Orasol Black RL or Intraplast Black RL/Solvent Black 29, Lapranol Black BR, Savinyl Black RLS, Orasol Black RLP, Neozapon Black X57; solvent yellow dyes inclusive of Savinyl Yellow 2 RLS, Savinyl Yellow RLSN, Intraplast Yellow 2GLN, Neozapon Yellow 081, Neozapon Yellow 141, Levaderm Lemon Yellow, Zapon Fast Yellow CGR, Aizen Fast Yellow CGNH, Zapon Yellow 100, Zapon Yellow 157, and Savinyl Yellow RLS; magenta dyes such as Neozapon Red 492, Direct Brilliant Pink B, Savinyl Pink 6 BLS, Savinyl Red 3 BLS, Orasol Red 2 BL, Intraplast Red G (Orasol Red), Savinyl Red BLSN, Savinyl Scarlet RLS, Savinyl Fire Red 3GLS, and Zapon Red 335; cyan dyes such as Orasol Blue 2 GLN, Neozapon Blue 807, Savinyl Blue RLS, Savinyl Blue GLS, Orasol Blue GN, and Losol Blue; brown dyes inclusive of Zapon Brown 187 and Savinyl Brown GLS, Solvent Green 3, Sudan Black B, Ceres Blue 2V, Liquid Oil Jet Black, Macrolex Red G Gram, Macrolex Yellow 3G, Victoria Blue R, available from Bayer AG, Leverkusen, Germany, Morfast Blue 100, Morfast Red 104, and Morfast Red 100, available from Morton International Specialty Chemicals Group, Chicago, Ill.; mixtures thereof; and the like with preferred dyes in embodiments including Reactint Black 57AB, Reactint Black X40LV, Reactint Blue 17AB, Reactint Blue X3LV, Reactint Blue X19, Reactint Red X26B-50, Reactint Red X520, Reactint Violet X80LT, Reactint Orange X38, and Reactint Yellow X15, all available from Milliken Chemicals. Typically, the dye or pigment is present in the ink in an amount of from about 0.01 to about 10 percent by weight, preferably from about 0.05 to about 4 percent by weight, and more preferably from about 0.1 to about 3 percent by weight, although the amount can be outside these ranges. Specific pigment examples include carbon black, magenta, yellow, cyan pigments, or mixtures thereof selected in effective amounts of, for example, from 1 to about 10 weight percent.

Optional ink additives include biocides, such as Dowicil 150, 200, and 75, benzoate salts, sorbate salts, and the like, present in effective amounts, such as for example an amount of from about 0.0001 to about 4 percent by weight, and preferably from about 0.01 to about 2.0 percent by weight; pH controlling agents such as acids; or bases, phosphate salts, carboxylates salts, sulfite salts, amine salts, and the like, present, for example, in an amount of from 0 to about 1 percent by weight and preferably from about 0.01 to about 1 percent by weight, based on the weight of the ink components.

The inks of the present invention are particularly suitable for printing processes wherein the substrate, such as paper, transparency material, or the like, is heated during the printing process to facilitate formation of the liquid crystalline phase within the ink. When transparency substrates are employed, temperatures typically are limited to a maximum of about 100° C. to about 110° C., since the polyester typically employed as the base sheet in transparency sheets tends to deform at higher temperatures. Specially formulated transparencies and paper substrates can, however, tolerate higher temperatures, and frequently are suitable for exposure to temperatures of 150° C. or even 200° C. in some instances. Typical heating temperatures are from about 40° C. to about 140° C., and preferably from about 60° C. to about 95° C., although the temperature can be outside these ranges.

The reversible crosslinked vehicle can be prepared by reacting an anhydride with an organic diamine compound by a condensation process. In one embodiment of this invention, the reversible crosslinked vehicle can be prepared, for example, by charging a reactor, such as a 300 milliliter Parr reactor equipped with a distillation apparatus, with from about 0.5 mole equivalent of an anhydride, such as phthalic anhydride or succinic anhydride, with about 0.5 mole equivalent of an organic diamine such as 1,12-dodecane diamine, and optionally a condensation catalyst, such as dibutylstannoic acid, at a temperature of from about 150° C. to about 185° C. with stirring for a duration of from about 3 to 6 hours. During this time, water is collected as a byproduct in the distillation receiver. The reaction mixture is then poured into a pan and allowed to cool to room temperature, about 25° C.

The inks of the present invention can be prepared by any suitable method. For example, the inks can be prepared by gently stirring or shaking the individual components, such as melt mixing the vehicle with a colorant at a temperature of from about 90° C. to about 130° C., followed by cooling to about 25° C.

The inks of the present invention are particularly suitable for use in acoustic ink jet printing processes. In acoustic ink jet printing, reference a number of the copending applications and patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference, for example, *IBM Technical Disclosure Bulletin,* Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered.

The size of the ejection orifice is a critical design parameter of an ink jet because it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosities and inks containing pigments and other particulate components. Acoustic ink printers embodying printheads comprising acoustically illuminated spherical focusing lenses can print precisely positioned pixels (picture elements) at resolutions which are sufficient for high quality printing of relatively complex images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), however, in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (1 May 1989) and references therein, the disclosure of which is totally incorporated herein by reference.

Other modifications of the present invention may occur to those of ordinary skill in the art subsequent to a review of the present application, and these modifications, including equivalents thereof, are intended to be included within the scope of the present invention.

EXAMPLE I

Synthesis of the reversible crosslinked vehicle from JEFFAMINE™ EDR-192, a poly(ethylylene glycol) bis(2-aminopropyl ether) of a molecular weight of 192 grams per mole, and phthalic anhydride was accomplished as follows:

A 300 milliliter Parr reactor equipped with a mechanical stirrer and a distillation apparatus was charged with 94 grams of JEFFAMINE™ 192 obtained from Huntsman Chemical Company, and 74 grams of phthalic anhydride. The mixture was then heated to 100° C. over a 2 hour period, followed by increasing the temperature slowly to 150° C. and then to 175° C. over a four hour period. The pressure was then reduced from atmospheric pressure to about 1 millimeter Hg, and these conditions were maintained for an additional one hour, wherein the total amount of water collected in the distillation receiver during the process was measured to be about 5 milliliters. The pressure was then increased to atmospheric pressure and the product, a viscous liquid, comprised of a mixture of N'-ethyloxyethyloxy ethyloxyethylamine phthalimide and crosslinked poly(N'-(ethyloxyethyloxy ethyloxy)ethylamine) phthalamide, was poured into a metal container and left undisturbed to cool down to room temperature (about 25° C. throughout the Examples).

EXAMPLE II

Synthesis of the reversible crosslinked vehicle from JEFFAMINE™ D-230, a poly(propylene glycol) bis(2-aminopropyl ether) of molecular weight of 230 grams per mole, and phthalic anhydride was accomplished as follows:

A 300 milliliter Parr reactor equipped with a mechanical stirrer and a distillation apparatus was charged with 115 grams of JEFFAMINE™ D-230 obtained from Huntsman Chemical Company, and 74 grams of phthalic anhydride. The mixture was then heated to 100° C. over a 2 hour period, followed by increasing the temperature slowly to 150° C. and then to 175° C. over a four hour period. The pressure was then reduced from atmospheric pressure to about 1 millimeter Hg, and these conditions were maintained for an additional one hour, wherein the total amount of water collected in the distillation receiver during the process was measured to be about 8 milliliters. The pressure was then increased to atmospheric pressure and the product, a viscous liquid comprised of a mixture of N'-(polypropyloxy) propylamine phthalimide crosslinked poly(N'-(polypropyloxyl)propylamine) phthalamide, was poured into a metal container and left undisturbed to cool down to room temperature.

EXAMPLE III

Synthesis of the reversible crosslinked vehicle obtained from JEFFAMINE™ D-400, a poly(propylene glycol) bis (2-aminopropyl ether) of a molecular weight of 400 grams per mole, and phthalic anhydride was accomplished as follows:

A 300 milliliter Parr reactor equipped with a mechanical stirrer and a distillation apparatus was charged with 100 grams of JEFFAMINE™ D-400 obtained from Huntsman Chemical Company, and 37 grams of phthalic anhydride. The mixture was then heated to 100° C. over a 2 hour period, followed by increasing the temperature slowly to 150° C. and then to 175° C. over a four hour period. The pressure was then reduced from atmospheric pressure to about 1 millimeter Hg, and these conditions were maintained for an additional hour, wherein the total amount of water collected in the distillation receiver during the process was measured to be about 4 milliliters. The pressure was then increased to atmospheric pressure and the product, a viscous liquid comprised of a mixture of N'-(polypropyloxy)propylamine phthalimide and crosslinked poly(N'-(polypropyloxyl) propylamine) phthalamide, was poured into a metal container and left undisturbed to cool down to room temperature.

EXAMPLE IV

Synthesis of the reversible crosslinked vehicle obtained from JEFFAMINE™ T-403, a poly(propylene glycol) tris (2-aminopropyl ether) of molecular weight of 403 grams per mole, and phthalic anhydride was accomplished as follows:

A 300 milliliter Parr reactor equipped with a mechanical stirrer and a distillation apparatus was charged with 100.8 grams of JEFFAMINE™ T-403 obtained from Huntsman Chemical Company, and 37 grams of phthalic anhydride obtained from Fisher Chemical Company. The mixture was then heated to 100° C. over a 2 hour period, followed by increasing the temperature slowly to 150° C. and then to 175° C. over a four hour period. The pressure was then reduced from atmospheric pressure to about 1 millimeter Hg, and these conditions were maintained for an additional one hour, wherein the total amount of water collected in the distillation receiver during the process was measured to be about 4 milliliters. The pressure was then increased to atmospheric pressure and the product, a viscous liquid comprised of a mixture of N'-(polypropyloxy)propylamine phthalimide and crosslinked poly(N'-(polypropyloxyl) propylamine) phthalamide, was poured into a metal container and left undisturbed to cool down to room temperature.

EXAMPLE V

Synthesis of the reversible crosslinked vehicle generated from 1,12-dodecanediamine and phthalic anhydride was accomplished as follows:

A 300 milliliter Parr reactor equipped with a mechanical stirrer and a distillation apparatus was charged with 66.8 grams of 1,12-dodecanediamine obtained from E. I. DuPont and 49.4 grams of phthalic. The mixture was then heated to 100° C. over a 2 hour period, followed by increasing the temperature slowly to 150° C. and then to 175° C. over a four hour period. The pressure was then reduced from atmospheric pressure to about 1 millimeter Hg, and these conditions were maintained for an additional hour, wherein the total amount of water collected in the distillation receiver during the process was measured to be about 5 milliliters. The pressure was then increased to atmospheric pressure and the product comprised of a mixture of N'-(12-aminododecyl) phthalimide and crosslinked poly(N'-12-aminododecyl) phthalamide, was poured into a metal container and left undisturbed to cool down to room temperature.

EXAMPLE VI

Synthesis of the reversible crosslinked vehicle polymer generated from 1,12-dodecanediamine and dodecenyl succinic anhydride was accomplished as follows:

A 300 milliliter Parr reactor equipped with a mechanical stirrer and a distillation apparatus was charged with 66.8 grams of 1,12-dodecanediamine obtained from E. I. DuPont, and 88.7 grams of dodecenyl succinic anhydride obtained from Lonza. The mixture was then heated to 100° C. over a 2 hour period, followed by increasing the temperature slowly to 150° C. and then to 175° C. over a four hour period. The pressure was then reduced from atmospheric pressure to about 1 millimeter Hg, and these conditions were maintained for an additional hour, wherein the total amount of water collected in the distillation receiver during the process was measured to be about 5 milliliters. The pressure was then increased to atmospheric pressure and the product comprised of a mixture of N'-(12-aminododecyl) 2-stearylsuccinimide crosslinked poly(N'-12-aminododecyl) 2-stearylsuccinamide was poured into a metal container and left undisturbed to cool down to room temperature.

Viscosity Measurements

The rheological characterization, and more specifically, the viscosity of the above prepared vehicles was performed using the Carri-Med CSL-100 controlled stress rheometer using a 4 centimeter, 2 degree cone and plate geometry.

| Example | Viscosity (cp) at 160° C. |
|---------|---------------------------|
| I       | 13                        |
| II      | 13                        |
| III     | 8                         |
| IV      | 10                        |
| V       | 15                        |

The vehicles were melt mixed with 5 percent by weight of Neopan Blue dye to form inks, and each ink was incorporated into an acoustic ink jet printing test fixture utilizing the ejection mechanism disclosed in *J. Appl. Phys.* 65(9), 1 May 1989, and references therein, the disclosure of which are totally incorporated herein by reference. A jetting frequency of 160 MHz was used to generate drops of about 2 picoliters, up to 12 drops per pixel at 600 spi. The images formed exhibited excellent quality, high definition, sharp edges, and waterfastness.

Other modifications of the present invention may occur to those of ordinary skill in the art based upon a review of the present application and these modifications, including equivalents thereof, are intended to be included within the scope of the present invention and the claims.

What is claimed is:

1. An ink composition comprised of a colorant and a reversible crosslinked component vehicle obtained from the reaction product of an monoanhydride and an polyamine, and which ink possesses a viscosity of from about 1 centipoise to about 25 centipoise at a temperature of from about 125° C. to about 185° C.

2. An ink composition in accordance with claim 1 wherein said reversible crosslinked vehicle is obtained from the reaction product of an anhydride and an organoamine, and which reaction product results in a temperature dependent equilibria reaction mixture of an imido amine and polyamide

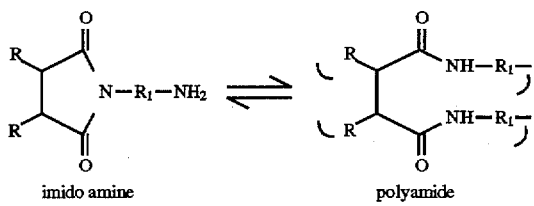

imido amine  ⇌  polyamide  I.

or

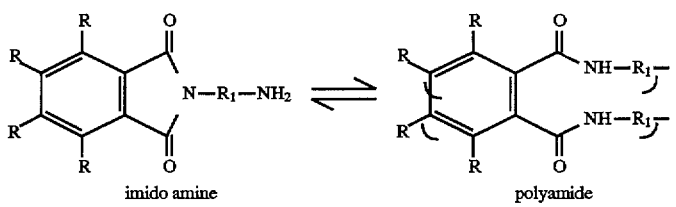

imido amine  ⇌  polyamide  II.

wherein R is hydrogen, alkyl, or alkenyl, each with from about 1 to about 36 carbon atoms, and $R_1$ is an alkylene or polyoxyalkylene, each with from about 2 to about 36 carbon atoms.

3. An ink composition in accordance with claim 2 wherein the vehicle I or II is comprised of from about 75 to about 95 percent by weight of polyamide and from about 5 to about 25 percent by weight of imido amine at a temperature of from about 20° C. to about 100° C., and the vehicle I or II is comprised of from about 75 to about 95 percent by weight of imido amine and from about 5 to about 25 percent by weight of polyamide at a temperature of from about 120° C. to about 160° C.

4. An ink composition in accordance with claim 1 wherein the anhydride is selected from the group consisting of phthalic anhydride, 3-methylphthalic anhydride, succinic anhydride, 2-alkylsuccinic anhydride, 2-methylsuccinic anhydride, 2-ethylsuccinic anhydride, 2-propylsuccinic anhydride, 2-butylsuccinic anhydride, 2-octylsuccinic anhydride, 2-stearylsuccinic anhydride, 2-octadecen-2yl-succinic anhydride, 2-decen-2yl-succinic anhydride, and 2-dodecen-2yl-succinic anhydride.

5. An ink composition in accordance with claim 2 wherein the organoamine is an organic diamine of 1,2-diaminoethane, 1,2-diaminopropane, 1,4-diaminobutane, 1,5-diaminopentane, 2-methylpentylene diamine, 1,6-diaminohexane, 1,8-diaminooctane, 1,10-diaminodecane, 1,12-diaminododecane, or poly(oxyalkyleneoxy)-diamine of the formula

wherein R is hydrogen or alkyl; and n is a number of from about 2 to about 21.

6. An ink composition in accordance with claim 2 wherein the imido amine is selected from the group consisting of N-aminododecyl phthalimide, N'-10-aminodecyl phthalimide, N'-8-amino-octyl phthalimide, N'-6-amino-hexyl phthalimide, N'-5-amino-pentyl phthalimide, N'-4-amino-butyl phthalimide, N'-3-amino-propyl phthalimide, N'-2-amino-ethyl phthalimide, N'-ethyloxyethylamine phthalimide, N'-ethyloxyethyloxyethylamine phthalimide, N'-ethyloxyethyloxyethyloxyethylamine phthalimide, N'-ethyloxyethyloxyethyloxyethyloxyethylamine phthalimide, N'-(polyethyloxy)ethylamine phthalimide, N'-(polypropyloxy)propylamine phthalimide, N'-12-aminododecyl 3-methylphthalimide, N'-(polyethyloxy)ethylamine 3-methylphthalimide, N'-(polypropyloxy)propylamine 3-methylphthalimide, N'-12-aminododecyl succinimide, N'-(polyethyloxy) ethylamine succinimide, N'-(polypropyloxy)propylamine succinimide, N'-12-aminododecyl 2-octylsuccinimide, N'-(polyethyloxy)ethylamine 2-octylsuccinimide, N'-(polypropyloxy)propylamine 2-octylsuccinimide, N'-12-aminododecyl 2-stearylsuccinimide, N'-(polyethyloxy)ethylamine 2-stearylsuccinimide, N'-(polypropyloxy)propylamine 2-stearylsuccinimide, N'-(polyethyloxy)ethylamine 2-octadecen-2yl-succinimide, N'-12-aminododecyl 2-octadecen-2yl-succinimide, N'-12-aminododecyl 2-decen-2yl-succinimide, and N'-12-aminododecyl 2-dodecen-2yl-succinmide.

7. An ink composition in accordance with claim 2 wherein the imido amine is N'-12-aminododecyl phthalimide, or N'-12-aminododecyl 2-stearylsuccinimide.

8. An ink composition in accordance with claim 2 wherein the polyamide possesses a molecular weight of from about 1,500 to about 15,000 grams per mole.

9. An ink composition in accordance with claim 2 wherein the ink is a solid at room temperature, about 20° C. to about 40° C.

10. An ink composition in accordance with claim 2 wherein said polyamide is poly(N'-12-aminododecyl) phthalamide, crosslinked poly(N'-10-aminodecyl) phthalamide, crosslinked poly(N'-8-amino-octyl) phthalamide, crosslinked poly(N'-6-amino-hexyl) phthalamide, crosslinked poly(N'-5-amino-pentyl) phthalimade, crosslinked poly(N'-4-amino-butyl) phthalamide, crosslinked poly(N'-3-amino-propyl) phthalimade, crosslinked poly(N'-2-amino-ethyl) phthalamide, crosslinked poly(N'-ethyloxyethylamine) phthalamide, crosslinked poly(N'-ethyloxyethyloxyethylamine) phthalamide, crosslinked poly (N'-ethyloxyethyloxyethyloxyethylamine) phthalamide, crosslinked poly(N'-ethyloxyethyloxyethyloxyethyloxyethylamine) phthalamide, crosslinked poly(N'-(polyethyloxy) ethylamine) phthalamide, crosslinked poly(N'-(polypropyloxy)propylamine) phthalamide, crosslinked poly(N'-12-aminododecyl) 3-methylphthalamide, crosslinked poly(N'-(polyethyloxy)ethylamine) 3-methylphthalamide, crosslinked poly(N'-(polypropyloxy)propylamine) 3-methylphthalamide, crosslinked poly(N'-

12-aminododecyl) succinamide, crosslinked poly(N'-(polyethyloxy)ethylamine) succinamide, crosslinked poly(N'-(polypropyloxy)propylamine) succinamide, N'-12-aminododecyl) 2-octylsuccinamide, crosslinked poly(N'-(polyethyloxy)ethylamine) 2-octylsuccinamide, crosslinked poly(N'-(polypropyloxy)propylamine) 2-octylsuccinamide, crosslinked poly(N'-12-aminododecyl) 2-stearylsuccinamide, crosslinked poly(N'-(polyethyloxy)ethylamine) 2-stearylsuccinamide, crosslinked poly(N'-(polypropyloxy)propylamine) 2-stearylsuccinamide, crosslinked poly(N'-(polyethyloxy)ethylamine) 2-octadecen-2yl-succinamide, crosslinked poly(N'-12-aminododecyl) 2-octadecen-2yl-succinamide, crosslinked poly(N'-12-aminododecyl) 2-decen-2yl-succinamide, or crosslinked poly(N'-12-aminododecyl) 2-dodecen-2yl-succinamide.

11. An ink composition in accordance with claim 10 wherein said polyamide is crosslinked poly(N'-12-aminododecyl) phthalamide, or crosslinked poly(N'-12-aminododecyl) 2-stearylsuccinamide.

12. An ink composition in accordance with claim 1 with a viscosity of from about 1 centipoise to about 20 centipoise at a temperature of from about 165° C. to about 180° C.

13. An ink composition in accordance with claim 1 wherein the vehicle is obtained by heating the reactants of an anhydride and organoamine at a temperature of from about 80° to about 165° C.

14. An ink composition in accordance with claim 1 wherein the crosslinked vehicle is a reversible resin which is a solid at room temperature, about 25° C., and liquid at jetting temperatures of from about 120° C. to about 165° C.

15. An ink composition in accordance with claim 1 wherein said colorant is a dye present in an amount of from about 0.05 to about 20 weight percent.

16. An ink composition in accordance with claim 1 wherein said colorant is a dye present in an amount of from about 1 to about 10 weight percent.

17. An ink composition in accordance with claim 1 wherein said colorant is a dye of cyan, magenta, yellow, blue, green, brown, black dye, or mixtures thereof.

18. An ink composition in accordance with claim 2 wherein said polyamide of I or II is present in an amount of from about 60 to about 99 weight percent at a temperature of from about 20° C. to about 120° C.

19. An ink composition in accordance with claim 2 wherein said polyamide of I or II is present in an amount of from about 85 to about 97 weight percent at a temperature of from about 20° C. to about 120° C.

20. An ink composition in accordance with claim 2 wherein said imido amine of I or II is present in an amount of from about 60 to about 99 weight percent at a temperature of from about 120° C. to about 165° C.

21. An ink composition in accordance with claim 2 wherein said imido amine of I or II is present in an amount of from about 85 to about 97 weight percent at a temperature of from about 120° C. to about 165° C.

22. An ink composition in accordance with claim 2 wherein alkyl contains from 1 to about 6 carbon atoms, alkenyl contains from 2 to about 10 carbon atoms, and the colorant is a pigment.

23. An ink composition in accordance with claim 1 wherein said organic amine is a tetraamine, a diamine, a triamine or mixtures thereof.

* * * * *